United States Patent [19]

Schlemmer et al.

[11] Patent Number: 4,953,169
[45] Date of Patent: Aug. 28, 1990

[54] GAS LASER FREQUENCY STABILIZATION ARRANGEMENT AND METHOD

[75] Inventors: Bernd Schlemmer; Goetz Berenbrock, both of Gevelsberg, Fed. Rep. of Germany

[73] Assignee: Siemens Aktiengesellschaft, Berlin and Munich, Fed. Rep. of Germany

[21] Appl. No.: 220,630

[22] Filed: Jul. 18, 1988

[30] Foreign Application Priority Data

Jul. 27, 1987 [IT] Italy ................................. 3724848

[51] Int. Cl.⁵ .................................................. H01S 3/13
[52] U.S. Cl. .................................. 372/32; 372/38; 372/28; 372/20
[58] Field of Search ................. 372/32, 34, 29, 38, 372/28, 30

[56] References Cited

U.S. PATENT DOCUMENTS

| | | | |
|---|---|---|---|
| 3,711,786 | 1/1973 | Vautier et al. | 378/32 |
| 3,747,004 | 7/1973 | Sasnet | 372/29 |
| 4,240,746 | 12/1980 | Courtenay et al. | 372/26 |
| 4,329,664 | 5/1982 | Javan | 372/32 |
| 4,398,293 | 8/1983 | Hall et al. | 372/32 |
| 4,468,773 | 8/1984 | Seaton | 372/32 |
| 4,556,980 | 12/1985 | Smith et al. | 378/29 |
| 4,592,058 | 5/1986 | Monoeon et al. | 372/32 |
| 4,660,206 | 4/1987 | Halmos et al. | 372/32 |
| 4,665,524 | 5/1987 | Cotter | 378/29 |
| 4,672,618 | 6/1987 | Wyntjes et al. | 378/34 |
| 4,716,444 | 12/1987 | Mongeon et al. | 372/32 |
| 4,724,314 | 2/1988 | Caimi | 372/29 |

OTHER PUBLICATIONS

"Dynamische Eigenschaften von Laser-Oszillatoren," Herziger et al., Leitschrift der Physik 206, pp. 446-456 (1967).

"17.4 Mbit/s Heterodyne Data Transmission at 1.5 μm Wavelength with Automatic endless Polarisation Control", Noe et al., 6th European Symposium on Optoelectronics (1986).

"Gas-Laser Frequency Stabilization", White, Microwaves, Jan. 1987, pp. 51-61.

Primary Examiner—Léon Scott, Jr.
Attorney, Agent, or Firm—Hill, VanSanten, Steadman & Simpson

[57] ABSTRACT

A frequency control arrangement for a gas laser operable in two longitudinal modes of laser oscillation includes a receiver for generating a difference frequency signal formed from the two longitudinal modes and mixing the difference frequency signal with a reference signal. The resulting intermediate signal is used to control an adjusting element on the laser resonator so that the laser emission is held at a predetermined frequency value.

12 Claims, 2 Drawing Sheets

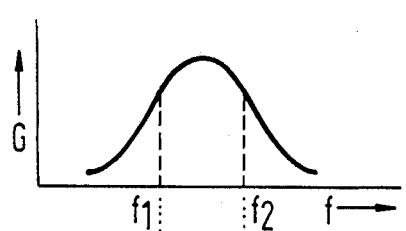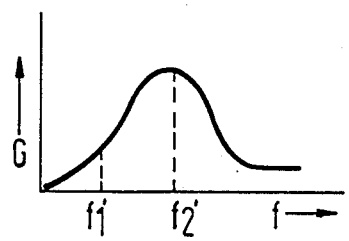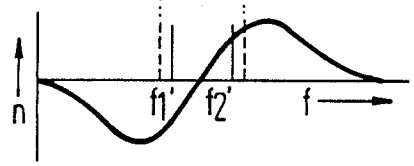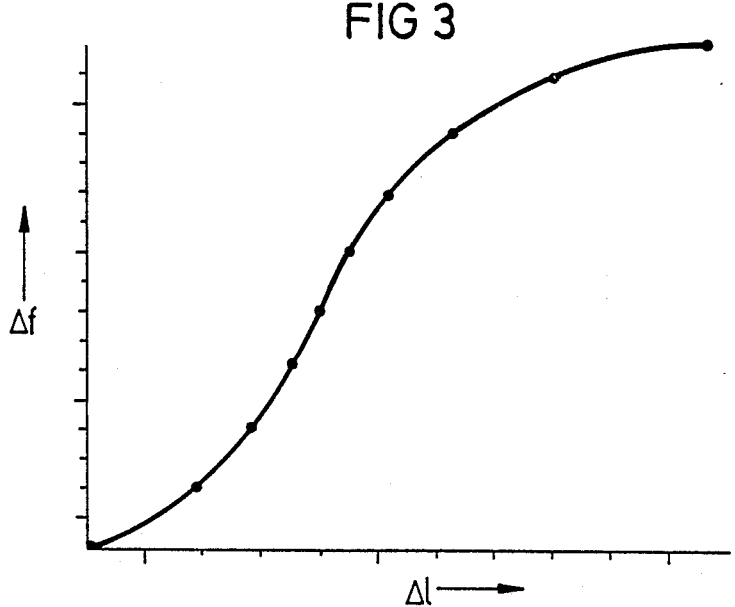

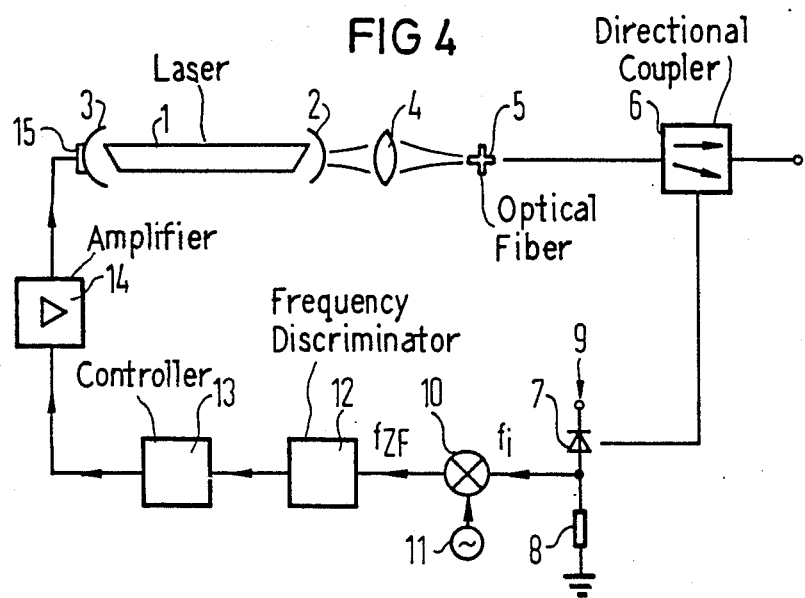
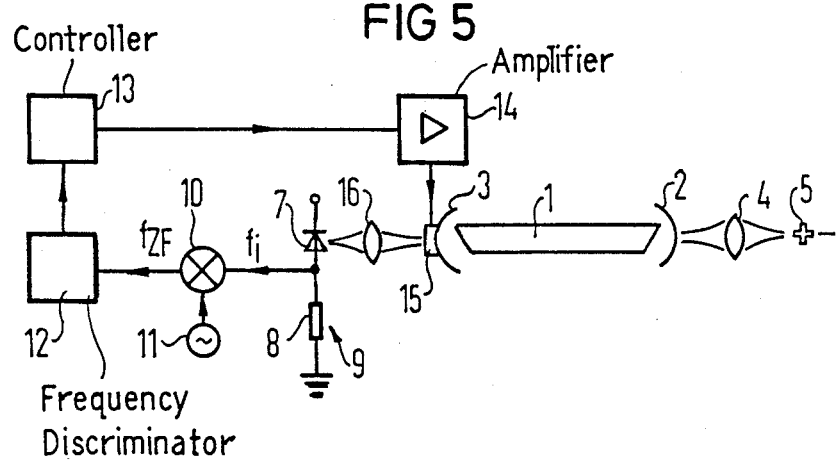

GAS LASER FREQUENCY STABILIZATION ARRANGEMENT AND METHOD

BACKGROUND OF THE INVENTION

1. Field of the Invention

The present invention relates generally to a gas laser arrangement for adjusting the laser resonator.

2. Description of the Related Art

A gas laser including a frequency control is known from the conference papers of the 6th European Symposium on Optoelectronics, Paris 1986, pages 420 and 421. Two longitudinal modes of laser oscillation are excited and an intermediate frequency signal that arises at an optical receiver is switched to a frequency control unit that contains an amplitude discriminator. Through a final control element for modifying the optical length of the resonator at a given constant test frequency, the amplitude discriminator adjusts the amplitude level to a constant value that lies at a relatively steep portion of a curve of the intensity of the intermediate frequency signal over the frequency. The laser frequency is stabilized as a result. The frequency stabilization, however, is sensitive to amplitude fluctuations of the two longitudinal modes that are transmitted in power fluctuations of the intermediate frequency signal and that can assume considerable values depending upon the phase relation of the two modes relative to one another.

Summary of the Invention

An object of the present invention is to eliminate disturbances due to amplitude fluctuations yet provide frequency stabilization of gas lasers in which two longitudinal oscillation modes of laser excitation are generated. This and other objects of the invention are achieved in a gas laser in which an intermediate frequency of the two longitudinal modes is provided to a photoreceiver, and an output of the photoreceiver is connected to a first input of a frequency mixer, the second input of which is connected to a reference signal generator. The output signal of the frequency mixer is connected to a frequency discriminator which in turn is connected to a final control element that adjusts the dimensions of the laser resonator.

The present invention utilizes an effect which is known from the publication Zeitschrift fuer Physik volume 206, pages 446 thru 456, (1967). In particular, a region of anomalous, or abnormal, dispersion is situated in the region of a spectral line in the laser medium. In other words, for a laser emission, the refractive index at the region rises quickly with frequency and as a result thereof, laser frequencies that lie outside of the region of maximum intensity of the spectral line are shifted toward the region of maximum intensity. This effect is known as the "frequency pulling effect" according to page 447 of the above publication.

The change, or shift, in frequency can be identified from an intermediate frequency signal at little expense. The intermediate frequency signal is derived from a frequency that is intermediate the frequencies of the two longitudinal modes excited in the gas laser. When the resonator length is changed by fractions of a wavelength of the corresponding laser emission, the intermediate frequency signal changes. The variation of the intermediate frequency with the resonator length is constant to a high degree and, according to the present invention, is suitable for use in holding the laser frequency constant with great precision. The intermediate frequency lies in an easily useable frequency range at about 100 kHz and, thus, can be governed with relatively low cost evaluation circuits particularly when compared to circuits operating at the significantly higher laser oscillation frequencies.

The size of the resonator structure of the laser is advantageously adjusted such that a first longitudinal mode of the laser oscillation lies in a frequency range on the rising edge of the intensity curve, such that the laser oscillation is just still guaranteed, and such that the second longitudinal mode of the laser oscillation lies in a middle region of the intensity curve and is shifted toward higher frequencies in comparison to the maximum of the curve. The intensity curve here refers to the change in laser output intensity over frequency. For this adjustment of the laser resonator, the first laser line—which serves for control—uses only a little energy and the second laser line that is interpeted is available having extremely high energy and is not disturbed by the first laser line to any noteworthy degree.

Relatively little energy is required for control of the resonator dimensions, so that adequate energy is available when the laser emission passes through a dense, substantially impermeable mirror for use for frequency control. The full laser power is thereby available for the intended applications and disturbances due to branching, or dividing, of the laser light do not occur. An arrangement of the circuit embodying the present invention is also designed so that it is relatively simple and space-saving.

BRIEF DESCRIPTION OF THE DRAWINGS

FIG. 1 is a graph showing changes in laser intensity G over laser frequency f on which the frequencies of two longitudinal modes have been marked;

FIG. 2 is a graph showing the dependency of refractive index n on laser frequency f in the region of laser resonance, the abscissa being to the same scale as that of FIG. 1 and showing a shift in frequency for the two longitudinal modes;

FIG. 3 is a graph showing the variation of intermediate frequencies $\Delta f$ for changes in length $\Delta l$ of the laser resonator;

FIG. 4 is a block circuit diagram of a first preferred frequency control circuit according to the principles of the present invention;

FIG. 5 is a block circuit diagram of a second preferred frequency control circuit of the invention; and FIG. 6 is a graph showing changes in laser intensity G over frequency f and showing the position of the two longitudinal modes stabilized at a preferred operating point by a frequency control circuit of the invention.

DESCRIPTION OF THE PREFERRED EMBODIMENTS

The intensity, or gain, of a laser discharge generally follows a Gaussian distribution curve in the region of laser resonance, as shown in FIG. 1. A plurality of different oscillation frequencies for various longitudinal modes can lie along and be intensified in accordance with the Gaussian distribution curve of laser intensity, as indicated by the oscillatory frequencies $f_1$ and $f_2$ of two longitudinal modes shown on the graph of FIG. 1. The two longitudinal modes described herein are adjacent one another with respect to frequency. The number of excited oscillatory modes lying on the intensity curve depends, among other things, on the optical length of the resonator since the frequency of the laser oscillations can be varied, although only within a very narrow range. Laser oscillations having different optical oscillatory frequencies are thus excitable within the allowable frequency variation. As a result, the dependency of gain G on frequency f as shown in FIG. 1 and as determined by the laser gas and the laser structure may simultaneously cover two or more laser lines when a correspondingly high number of laser oscillations are possible for a given resonator length. This, thus, allows the laser to oscillate in various frequencies. This effect leads to frequency instability which has a disturbing influence on the laser operation and use, particularly when high demands are made of the laser for frequency stability and should be eliminated.

Referring to FIG. 2, a graph shows changes in refractive index n of a laser over frequency f in the region of a laser line having an intensity curve as shown in FIG. 1. The refractive index n curve exhibits a known effect known as anomalous dispersion. In a laser, this leads to a pronounced change in the refractive index n in the region of maximum intensity, or gain, for the laser. As a consequence of the curve shape of the refractive index n, the first longitudinal mode of laser oscillation at a frequency $f_1$ is shifted toward the right along the refractive index n curve to a first shifted frequency $f'_1$; and the second longitudinal mode the second frequency $f_2$ is shifted toward the left along the refractive index n curve to a second shifted frequency $f'_2$. As can be seen in FIG. 2, the refractive index n corresponding to the first frequency $f_1$ lies below the horizontal axis and the refractive index n corresponding to the second frequency $f_2$ lies above the horizontal axis, the horizontal axis representing the refractive index n outside the region of greatest gain. The effect which causes the frequencies to move closer together is known from the literature as the frequency pulling effect, as disclosed, for example, in the publication Zeitschrift fuer Physik 206, pages 446–456 (1967), and particularly on page 447.

The subject matter of the present invention exploits the frequency pulling effect to control the oscillatory frequencies of the laser. The frequency spacing between first and second shifted frequencies $f'_2$ and $f'_1$ varies with the variation of the resonator length. This variation follows a reproducable curve as is shown in FIG. 3. The origin of the coordinate axis of FIG. 3 lie at a resonator length at which the first shifted longitudinal mode frequency $f'_1$ of the laser oscillation just barely begins to measurably oscillate.

The measuring principle of the present invention is inventively realized in circuits according to FIGS. 4 and 5. In FIG. 4, a laser 1 is provided including a pair of opposed resonator mirrors 2 ad 3 which form the resonator cavity. An emission of laser light which passes through the partially reflective mirror 2 is focused through focusing optics 4, which is, for example, one or more lenses, onto an optical fiber 5 as shown schematically in FIG. 4. The optical fiber 5 carries the laser light to a fiber directional coupler 6 where a small portion of the total laser emission is divided or branched off from the main portion of the laser emission and supplied to a photoreceiver 9. The photoreceiver 9 of the illustrated embodiment is expediently composed of a photodiode 7 and a resistor 8 connected between a power supply and ground. The photodiode 7 responds to differential frequencies $\Delta f$ between two neighboring longitudinal mode frequencies f', and $f'_2$ of the laser oscillation but does not respond to the oscillatory frequencies of the laser themselves due to the frequency response characteristics of the photodiode used.

The photoreceiver 9, therefore, converts the difference frequency $\Delta f$ between the two longitudinal modes $f'_1$ and $f'_2$ into an electrical difference signal fi and this difference signal $f_i$ is conducted to a first input of a mixer 10. A second input of the mixer 10 is connected to a reference frequency source 11. The mixer 10 mixes the two signals and conducts them to a frequency discriminator 12 as an intermediate frequency signal $f_{ZF}$. The frequency discriminator 12 compares the input frequency with an internal, adjusted reference frequency and gives an output signal proportional to the difference of the two frequencies. The output signal from the frequency discriminator 12 is conducted through a proportional integral controller 13 and an amplifier 14, the output of which in turn is connected to control a final control element 15. The final control element is preferably in the form of a piezo-adjustement means mounted to adjust the position of the resonator mirror 3 proportionally to the voltage at the output of the amplifier 14. The circuit disclosed in FIG. 4, thus, holds the differential frequency $\Delta f$ to a prescribed operating point on the curve of FIG. 3 by controlling the optical length of the laser resonator. In an advantageous example we have found the following date:

HeNe-laser
resonator length 80 cm
wavelength 1.52 $\mu$m
$f_2 - f_1 = 190$ MHz
$\Delta 1$ (FIG. 3) 0 to 160 nm
$\Delta f$ (FIG. 3) 0 to 130 kHz reference frequency of the frequency discriminator = 450 kHz.

The circuit of FIG. 5 contains many of the same elements as in the circuit of FIG. 4 but instead uses residual light which emerges from the backside of a dense, substantially impermeable mirror 3' of the laser resonator. This residual light is conducted through a separate lens 16 onto the photoreceiver 9 which generates the difference signal $f_i$ from the difference frequency $\Delta f$ that is fed to the first input of the mixer 10. Thereafter, the same elements in the signal path as in FIG. 4 are provided, namely a frequency discriminator 12 connected to receive the signal $f_{ZF}$ at the output of the mixer 10, the proportional integral controller 13 connected at the output of the frequency discriminator 12 and having its output in turn feeding the amplifier 14. The output of the amplifier 14 is connected to the piezoelectric final control element 15 on the mirror 3'.

The main beam of the laser 1 is emitted along a beam path through the partially reflecting resonator mirror 2, for example, to focusing optics 4 and into an optical fiber 5 for use. Thus, the embodiment of FIG. 5, as compared to the embodiment of FIG. 4, eliminates the need for a fiber directional coupler 6 in the beam path of the main laser emission so that the main laser emission is not disturbed and is not attenuated before it is utilized.

With reference now to FIG. 6, the optimum operating condition of the circuits of FIGS. 4 and 5 is shown, wherein a first shifted longitudinal mode frequency $f'_1$ of the laser emission lies in the ascending region of the gain curve G over frequency f so that the laser emission at this frequency is sure to be maintained. The shifted frequency $f'_2$ of the second longitudinal mode lies in the proximity of the maximum of the gain curve G over frequency f at the side of the curve in the direction of higher frequencies. First, this guarantees a high gain at the frequency $f'_2$ of the second longitudinal mode since the first longitudinal mode at the frequency $f_1'$ is rendered harmless and, second, this guarantees that, for instance, a third longitudinal mode is not excited.

Thus, there is shown a frequency control arrangement for a gas laser for adjusting the oscillation modes of the laser to provide frequency stabilization. The present invention is particularly well suited for use with HeNe lasers having high constancy of the laser frequency.

Although other modifications and changes may be suggested by those skilled in the art, it is the intention of the inventors to embody within the patent warranted hereon all changes and modifications as reasonably and properly come within the scope of their contribution to the art.

I claim:

1. A control circuit for stabilizing the frequency of laser emission of a gas laser that has a laser tube and an optical resonator, said control circuit comprising:
   a photoreceiver means for generating an intermediate frequency signal from two longitudinal laser oscillation modes in said laser emission that are adjacent in frequency;
   means for supplying a portion of said laser emission to said photoreceiver means;
   a frequency mixer connected at an output of said photoreceiver means to receive said intermediate frequency signal;
   a reference signal generator connected to supply a reference frequency signal to a second input of said frequency mixer;
   a frequency discriminator connected at an output of said frequency mixer to receiver said intermediate frequency signal;
   a final control element connected to receive an output signal from said frequency discriminator, said final control element being adjustable in response to said frequency discriminator output signal to vary an optical length of said optical resonator to stabilize the frequency of said laser emission from said gas laser, said final control element mounted to adjust dimensions of said optical resonator so that a first longitudinal mode of laser oscillation lies in a region of an ascending edge of a gain curve of the laser and so that said first longitudinal mode of oscillation is still guaranteed, said final control element being mounted to adjust the dimensions of said resonator so that a second longitudinal mode of laser oscillation lies in a middle region of said gain curve of said laser shifted toward higher frequencies in comparison to a maximum of said gain curve.

2. A control circuit as claimed in claim 1, wherein said photoreceiver is positioned to receive residual light which penetrates a substantially impermiable mirror of said optical resonator.

3. A control circuit for stabilizing laser emission frequencies of a gas laser, said gas laser including an optical resonator formed by first and second mirrors, said control circuit comprising:
   a photoreceiver positioned to receive an emission from said gas laser, said photoreceiver emitting a signal corresponding to a difference between neighboring longitudinal laser oscillation modes;
   a mixer having a first input connected to receive said signal from said photoreceiver and having a second input;
   a reference frequency source connected to supply a reference frequency to said second input of said mixer;
   a frequency discriminator connected at an output of said mixer;
   a proportional integral controller connected at an output of said frequency discriminator; and
   a control element connected to receive an output signal from said proportional integral controller, said control element mounted to said first mirror of said laser resonator to adjust a geometric length of said resonator in response to signals received from said proportional integral controller so that a first longitudinal laser oscillation mode of said laser lies on an ascending portion of a laser gain curve and so that said first longitudinal mode is still guaranteed, and so that a second longitudinal laser oscillation mode lies in a middle region of said gain curve shifted toward higher frequencies in comparison to a maximum of said gain curve.

4. A control circuit as claimed in claim 3, further comprising:
   an amplifier connected between an output of said proportional integral controller and a signal receiving input of said control element.

5. A control circuit as claimed in claim 3, wherein said control element is a piezo-electric element mounted to adjust the position of said first mirror.

6. A control circuit as claimed in claim 3, further comprising:
   means for directing a portion of a main laser emission onto said photoreceiver.

7. A control circuit as claimed in claim 6, wherein said means for directing a portion of said main laser emission includes a directional coupler.

8. A control circuit as claimed in claim 4, further comprising:
   means for directing a residual laser emission of said gas laser onto said photoreceiver.

9. A control circuit as claimed in claim 3, wherein emissions from said gas laser that are directed onto said photoreceiver are emitted through said first mirror mounted for adjustment by said control element.

10. A method of frequency stabilizing a gas laser operating at two longitudinal modes, comprising the steps of:
    providing a difference signal corresponding in frequency to a difference between frequencies of said two longitudinal modes;
    mixing said difference signal with a reference frequency to provide an intermediate frequency signal;
    discriminating frequencies of said intermediate frequency signal;
    generating proportional signals to said discriminated frequencies; and
    adjusting an optical length of a resonator of said gas laser proportionally to said proportional signals so that a first of said two longitudinal modes lies in a region of an ascending edge of a gain curve of the gas laser, and so that a second of said two longitudinal modes lies in a middle region of said gain curve shifted toward higher frequencies in comparison to a maximum of said gain curve.

11. A method as claimed in claim 10, further comprising: detecting said difference between said frequencies of said two longitudinal modes by a divided portion of a main laser emission of said gas laser.

12. A method as claimed in claim 11, further comprising: detecting said differences between said frequencies of said two longitudinal modes by residual emission of said gas laser.

* * * * *